Patented Mar. 14, 1939

2,150,424

UNITED STATES PATENT OFFICE 2,150,424

ACCELERATORS

Howard I. Cramer, Cuyahoga Falls, Ohio, assignor to Wingfoot Corporation, Wilmington, Del., a corporation of Delaware No Drawing. Application November 5, 1934,
Serial No. 751,592

3 Claims. (Cl. 18—53)

This invention relates to the treatment of rubber and similar vulcanizable materials and particularly to the vulcanization of the same in the presence of a carbon bisulphide derivative of a secondary amine containing a furane ring as an accelerator of the rate of vulcanization.

An object of the invention is to provide a new class of accelerators. Another object is to provide a process of vulcanizing rubber in the presence of a material of the type mentioned whereby improved physical properties will be attained in the resulting vulcanized product. Other objects and advantages will become apparent as the description of the invention proceeds.

The invention comprises vulcanizing a vulcanizable rubber composition in the presence of a compound illustrated by the formula

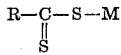

M representing metal, ammonium, substituted ammonium, dinitro aryl, aryl methylene, the group

or the group

and R in all instances representing a tertiary nitrogen atom having attached thereto two organic radicals at least one of which comprises a furane ring. Exemplary of such materials are (1) The metal salts of furfuryl dithiocarbamates such as, for example, zinc di (alpha furfuryl) dithiocarbamate having the formula:

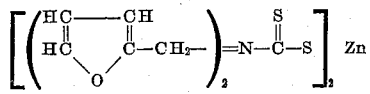

(2) The ammonium salts such as, for example, N-ethyl alpha furfuryl ammonium N-ethyl alpha furfuryl dithiocarbamate having the formula:

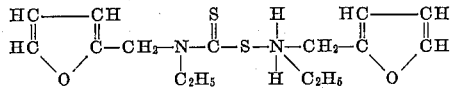

(3) The thiuram disulphides such as, for example, tetra alpha furfuryl thiuram disulphide having the formula:

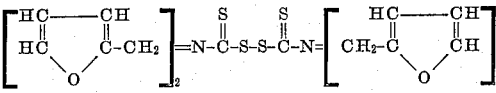

(4) The thiuram mono sulphides such as, for example, dimethyl di alpha furfuryl thiuram mono sulphide having the formula:

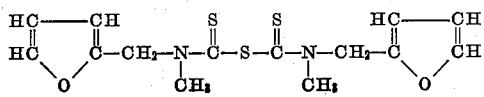

Others are phenyl methylene (benzal) bis di alpha furfuryl dithiocarbamate and dinitro phenyl di alpha furfuryl dithiocarbamate.

The methods of preparation of these new dithiocarbamic acid derivatives of secondary amines containing a furane ring are similar to those employed for known dithiocarbamic acid derivatives. Thus, the substituted ammonium salts may be prepared by treating two mols of the desired secondary amine containing a furane ring with one mol of carbon disulphide in an inert solvent, such as gasoline or petroleum ether, from which the salts readily precipitate. The metallic salts are preferably prepared by the addition of a soluble salt of a metal to an aqueous solution of the sodium dithiocarbamate, the latter being prepared by treating one mol of the secondary amine containing a furane ring with one mol of carbon disulphide and one mol of sodium hydroxide in aqueous solution. The thiuram disulphide may be conveniently prepared by the oxidation of the sodium salt of the dithiocarbamate in aqueous solution with ammonium persulphate. The thiuram mono sulphide may be prepared from the thiuram disulphide by desulphurizing the latter by treating it in alcohol solution with one mol of potassium cyanide. The dinitrophenyl esters are prepared by adding to a molar quantity of the sodium dithiocarbamate in alcohol or water one mol of dinitro chlor benzene in warm alcohol. The phenyl methylene (benzal) derivative is prepared similarly by reacting the sodium dithiocarbamate with benzal chloride and heating the mixture to 60–70° C. for a short time.

The secondary amines applicable for use in the practice of the invention may be represented by the formula

wherein R' is a group containing a furane ring and R'' is a monovalent organic radical such as alkyl, alicyclic, furyl or aralkyl groups. In general, any secondary amine containing a furane ring and in which aliphatic characteristics predominate may be employed in the practice of the invention.

Illustrative of secondary amines containing a furane ring are di alpha- and beta-furfuryl amines, di alpha- and beta- furyl amines, N-ethyl alpha- and beta- furfuryl amines, N-cyclohexyl alpha- and beta- furfuryl amines, N-benzyl alpha- and beta- furfuryl amines, di(alpha- or beta- 2-furyl ethyl) amines, N-methyl alpha furfuryl amine, N-iso butyl alpha furfuryl amine, N-beta phenyl ethylene alpha furfuryl amine, N-iso propyl alpha furfuryl amine, N-iso amyl alpha furfuryl amine, and the N-hexahydro tolyl alpha furfuryl amines.

Further exemplary of the invention are the following tables describing the properties of illustrative examples. Table I gives the melting points, if a solid compound, and the colors of the compounds. Table II gives the nitrogen, sulphur and metal, if any, contents for the compounds as compared with the theoretical percentages.

Table I

| | Compound | Melting point, °C. | Color |
|---|---|---|---|
| 1 | Di (alpha furfuryl) ammonium di (alpha furfuryl) dithiocarbamate. | Oil | Yellow. |
| 2 | Zinc di (alpha furfuryl) dithiocarbamate.. | 190-3 | White. |
| 3 | Lead di (alpha furfuryl) dithiocarbamate.. | 130-1 | Buff. |
| 4 | Tetra (alpha furfuryl) thiuram disulphide. | Oil | Brown. |
| 5 | Tetra (alpha furfuryl) thiuram mono sulphide. | Do | Do. |

Table II

| Compound | Analyses in percent | | | | | |
|---|---|---|---|---|---|---|
| | Found | | | Calculated | | |
| | Nitrogen | Sulphur | Metal | Nitrogen | Sulphur | Metal |
| 1 | | | | | | |
| 2 | 5.42 | 22.62 | 12.50 | 4.92 | 22.55 | 11.47 |
| 3 | 4.03 | 18.98 | 28.00 | 3.93 | 18.01 | 29.07 |
| 4 | 5.90 | 23.20 | | 5.55 | 25.44 | |
| 5 | 6.98 | 18.82 | | 5.92 | 20.34 | |

Further illustrative of these new dithiocarbamates and thiuram sulphides are potassium di (alpha furfuryl) dithiocarbamate, penta methylene ammonium alpha furfuryl dithiocarbamate, ammonium N-cyclohexyl alpha furfuryl dithiocarbamate, zinc benzyl alpha furfuryl dithiocarbamate, lead, ethyl alpha furfuryl dithiocarbamate, isobutyl alpha furfuryl ammonium isobutyl alpha furfuryl dithiocarbamate, ammonium n-propyl alpha furfuryl dithiocarbamate, zinc iso amyl alpha furfuryl dithiocarbamate, and sodium beta phenyl ethylene furfuryl dithiocarbamate. Others are morpholyl di(alpha furfuryl) thiuram di- and mono- sulphides, dicyclohexyl di(alpha furfuryl) thiuram di- and mono- sulphides, diethyl di(alpha furfuryl) thiuram di- and mono- sulphides, di benzyl di alpha furfuryl thiuram di- and mono- sulphides, dimethyl di(alpha furfuryl) thiuram di- and mono- sulphides, di hexahydro tolyl di(alpha furfuryl) thiuram di- and mono- sulphides and di(beta phenyl ethylene ) di(alpha furfuryl) thiuram di- and mono- sulphides.

Conveniently any of these new accelerators or a mixture thereof may be added to any of the ordinary rubber mixes in an amount which may be determined according to the usual methods. It has been found for example that the compounds of the present invention are excellent accelerators in a rubber composition of the following formula:

| | Parts by weight |
|---|---|
| Extracted pale crepe rubber | 100 |
| Zinc oxide | 5 |
| Sulphur | 3 |
| Stearic acid | 1.5 |
| Accelerator | 0.5 |

Samples of the compounded rubber made up in accordance with this formula were subjected to vulcanization by steam heat in a mold after which they were subjected to physical tests to ascertain their elasticity and tensile strength.

The results of these tests are given in the following table:

| Cure in mins., °F. | Ult. tensile in kgs/cm.² | Max. elong. in percent | Modulus in kgs/cm.² | |
|---|---|---|---|---|
| | | | 500% | 700% |

*Di alpha furfuryl ammonium di alpha furfuryl dithiocarbamate*

| 45/285 | 18 | 875 | 6 | 9 |
| 60 | 26 | 895 | 7 | 12 |
| 90 | 54 | 960 | 8 | 16 |

*Zinc di alpha furfuryl dithiocarbamate*

| 10/260 | 123 | 825 | 17 | 58 |
| 20 | 145 | 750 | 18 | 106 |
| 30 | 180 | 775 | 32 | 117 |
| 40 | 115 | 710 | 31 | 106 |

*Lead di alpha furfuryl dithiocarbamate*

| 10/260 | 94 | 765 | 18 | 64 |
| 15 | 107 | 720 | 26 | 95 |
| 20 | 127 | 725 | 29 | 110 |
| 40 | 100 | 680 | 32 | |

*Tetra alpha furfuryl thiuram disulphide*

| 10/260 | 6 | 360 | | |
| 15 | 75 | 790 | 14 | 41 |
| 20 | 161 | 800 | 24 | 87 |
| 40 | 183 | 780 | 28 | 110 |
| 60 | 163 | 800 | 26 | 86 |

*Tetra alpha furfuryl thiuram mono sulphide*

| 10/260 | No cure | | | |
| 15 | 78 | 920 | 10 | 23 |
| 20 | 156 | 760 | 29 | 108 |
| 40 | 170 | 790 | 27 | 94 |
| 60 | 145 | 810 | 24 | 72 |

It will be apparent from the preceding tables that the use of these compounds results in excellent cures at comparatively low temperatures, the vulcanized products having excellent physical qualities both in regard to physical strength and elongation.

It will be understood that by the term "rubber" is meant any of the ordinary forms of rubber such as latex, balata, reclaimed rubber, gutta-percha, and the ordinary coagulated forms of *Hevea brasiliensis* tree. It is intended that the patent shall cover, by suitable expression in the appended claims, whatever features of patentable novelty reside in the invention.

What I claim is:

1. The process of treating rubber which comprises subjecting it to vulcanization in the presence of tetra (alpha furfuryl) thiuram disulphide.

2. The process of treating rubber which comprises subjecting it to vulcanization in the presence of a thiuram sulphide having attached to each of the nitrogen atoms two radicals each of which is a radical selected from the group consisting of furyl, furfuryl and 2-furyl ethyl radicals.

3. The process of treating rubber which comprises subjecting it to vulcanization in the presence of a tetra (alpha furfuryl) thiuram sulphide.

HOWARD I. CRAMER.